No. 883,616. PATENTED MAR. 31, 1908.
F. E. BOSWORTH.
MIRROR.
APPLICATION FILED JUNE 4, 1907.
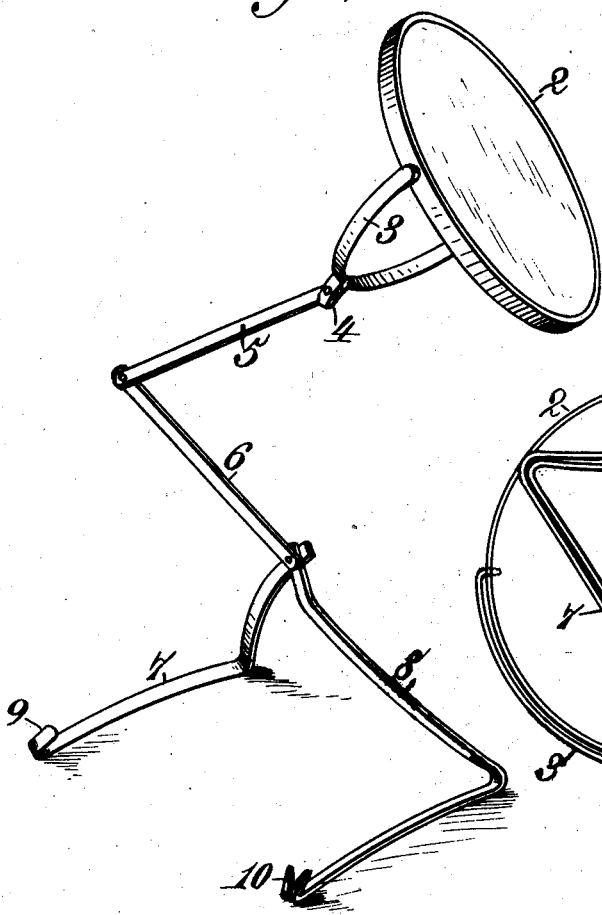
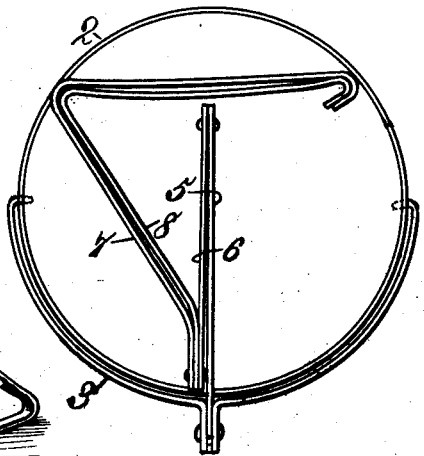
Witnesses,
Inventor,
Francis E. Bosworth,
By James L. Norris
Atty.

UNITED STATES PATENT OFFICE.

FRANCIS E. BOSWORTH, OF SAN FRANCISCO, CALIFORNIA.

MIRROR.

No. 883,616.  Specification of Letters Patent.  Patented March 31, 1908.

Application filed June 4, 1907. Serial No. 377,208.

*To all whom it may concern:*

Be it known that I, FRANCIS E. BOSWORTH, a citizen of the United States, residing at San Francisco, in the county of San Francisco and State of California, have invented new and useful Improvements in Mirrors, of which the following is a specification.

This invention relates to mirrors, and the object of the invention is to provide a simple foldable article of this character.

The device is of such a nature that it can be folded within a small compass which is of importance in that it can be placed in any traveler's kit, suit case or the like, and will occupy but very little room therein. The mirror is provided with supporting means, which in the present case is susceptible of several adjustments and by means of which the mirror can be used as a hand glass, or as a standing glass, or said supporting means may be connected with the clothing. The mirror may be employed in many connections; for example, it may be used in shaving in which case it may be connected with the vest or other garment of the user to leave both arms of the latter free during the operation mentioned, or when thus mounted the mirror may be used for massaging or otherwise manipulating or treating the face. I mention these as several uses to which the mirror may be put.

In the drawings accompanying and forming a part of this specification I show in detail one form of embodiment of the invention, which to enable those skilled in the art to practice said invention will be hereinafter set forth in detail while the novel features of the invention will be included in the claims succeeding said description.

Referring to said drawings, Figure 1 is a perspective view of a mirror including my invention. Fig. 2 is a back view of the same in folded or collapsed condition. Fig. 3 is a perspective view on a reduced scale showing one manner of using the mirror.

Like characters refer to like parts throughout the several figures.

The device includes in its construction a mirror proper which may be of any desirable shape and which will be hereinafter referred to as the mirror, the same being denoted by the reference character 2 in the drawings. Said mirror 2 is connected with a bail as 3 preferably of spring form or otherwise resilient, by reason of which the bail will hold without extraneous means for this purpose, the mirror in its different adjusted positions, it being understood that the mirror is pivotally or otherwise suitably associated with the branches of the bail for such adjustment. The radius of the bail is greater than that of the mirror, so that the mirror may be received within the bail when the article is folded, as clearly shown in Fig. 2.

The bail 3 is illustrated as provided substantially centrally between its ends with an approximately U-shaped offset 4 between the sides of which is jointed as by means of a pivot one end of a link. The opposite end of said link 5 is similarly united with one end of a link as 6. In the present instance the links are of substantially similar construction and their axes of motion are in parallelism with the axis of motion of the mirror. This enables the two links to fold against the back of the mirror as shown in Fig. 2. The two links consist preferably of flat strips of metal and when thus folded one fits flatwise against the other. The two links 5 and 6 constitute in the present case part of the supporting means to which I have hereinbefore referred. The remainder of said supporting means consisting in the present case of the two substantially similar members 7 and 8. The inner ends of these members 7 and 8 are jointed to each other and are also jointed to the outer link 6. I prefer to make the two members 7 and 8 of angular form, and while they are shown as being of acute angular shape this is not essential. The common axis of motion of the two members 7 and 8 is in parallelism with the other axes to which I have previously referred. These members 7 and 8 may be made of strips of metal and each may be so folded as to lie face to face with the companion member and also to fit against the back of the mirror, as shown clearly in Fig. 2. To use the device as a hand-glass the two links 5 and 6 and angular members 7 and 8 when thus folded will be swung out as a unit to extend from the mirror 2 and when in this relation the several parts 5, 6, 7 and 8 can be grasped as a handle or the two links 5 and 6 can be opened out and the two members 7 and 8 can be spread apart as shown in Fig. 1 so that the outer branches of said members 7 and 8 can rest upon a table or other support. In this relation the mirror presents all the advantages of a standing glass. The two members 7 and 8 can be spread apart to any desirable extent and the angular relation of the links 5 and 6 can be varied to regulate the height of the mirror 2. The angular adjustment of the latter can easily be accomplished. The outer branch of the member 7 terminates in a hook as 9, while the outer branch of the companion member 8 terminates in a hook as 10, the latter being of prong or spur form. The prong or spur hook is of advantage particularly when the device is supported by the clothing and in Fig. 3 of the drawings I have shown such a use of the device. In this particular figure the outer branches of the two members 7 and 8 are thrust into the space between the vest and shirt and are laterally separated from each other. The spurred portion of the hook can penetrate a slight extent the vest so as to prevent the possibility of the article being accidentally dismounted. The pronged or spurred portion of the hook 10 can also be thrust in wood work.

There are many other ways in which the device may be used; for instance, the members 7 and 8 may be connected with a window sill, in which latter event the pronged portion of the hook 10 will be thrust in the wood work of the sill. The invention, however, resides not so much in the particular use to which the article may be put, but in the structure, whereby I can put said article to these and many other uses which need not be mentioned herein.

The article is light yet strong. It can be inexpensively and readily made. It occupies when collapsed practically no more space than would be occupied by the mirror 2. Its various adjustments can be quickly and easily obtained.

I may provide rivets to unite the links 5 and 6 to each other, the link 5 to the bail 3 and the link 6 to the connected angular members 7 and 8 and these rivets will be so associated with the respective parts that the adjustments will be automatically maintained, but can be changed by manipulation.

What I claim is:

1. The combination of a mirror, two jointed angular members, the free portions of which terminate in hooks, and means flexibly connecting said jointed members and mirror.

2. The combination of a mirror, two jointed substantially angular members, each terminating in a hook and one of the hooks being pronged, and flexible connecting means extending from the joint between said members to said mirror.

3. The combination of a mirror, two jointed angular members, and a linkage connection united with said members at their joint and also operatively connected with the mirror.

4. The combination of a mirror, a bail for supporting said mirror for swinging movement, a plurality of jointed links, one of which is connected with said bail, and a plurality of jointed members connected with another of said links, said jointed members being of angular form.

5. The combination of a mirror, a bail supporting said mirror for swinging movement and adapted to receive said mirror, a plurality of links jointed to each other and one connected with the bail, the two links being foldable against the back of the mirror, and two jointed members of angular form connected with the outermost end of the connected links and also foldable against said back.

In testimony whereof I have hereunto set my hand in presence of two subscribing witnesses.

FRANCIS E. BOSWORTH.

Witnesses:
ED AINSCOM,
CHAS. SCHNEKLOTH.